Patented July 22, 1924.

1,502,421

UNITED STATES PATENT OFFICE.

HUGH SPENCER COOPER, OF CLEVELAND, OHIO, ASSIGNOR TO KEMET LABORATORIES COMPANY, INC., A CORPORATION OF NEW YORK.

ENAMEL OPACIFYING COMPOSITION AND PROCESS OF MAKING THE SAME.

No Drawing.      Application filed March 29, 1921. Serial No. 456,742.

*To all whom it may concern:*

Be it known that I, HUGH S. COOPER, a citizen of the United States, residing at Cleveland, in the county of Cuyahoga and State of Ohio, have invented certain new and useful Improvements in Enamel Opacifying Compositions and Processes of Making the Same, of which the following is a specification.

Although zirconium compounds have not to any great extent supplanted the standard enamel opacifying materials, tin oxide and the cheaper sodium metantimonate or "leukonin," it has long been known that zirconium compounds have possibilities in this direction. In my prior application, Serial No. 436,593, filed January 11, 1921, I have shown that zirconium oxide is, under certain conditions, an excellent opacifier. The oxide, however, is itself a relatively expensive material, and many attempts have been made to utilize the naturally occurring and hence much cheaper zirconium silicate, or zircon.

If the natural product is merely ground as fine as possible and then used as an opacifier, the results are unsatisfactory. The color and opacity of the resulting enamel are only fair and the gloss is poor. Various processes of treating the natural material have been resorted to in order to overcome these defects, such processes usually involving a fusion with alkali and seeking to modify the content of the material in silica, alkali and water. When applied to some specimens of zircon, satisfactory opacifying agents are produced by some of these processes, but by carefully subjecting many samples of the natural material to such processes, as described in the patents, I have found the resulting products to be entirely too variable in composition to meet the needs of the trade, many of the compositions obtained being worthless as opacifiers.

The principal source of the mineral zircon, at present, is Brazil. An analysis of a typical sample of the Brazilian mineral is as follows:

| | |
|---|---|
| Zirconium oxide | 57.88 |
| Titanium oxide | 6.62 |
| Silica | 28.91 |
| Ferric oxide | 0.52 |
| Aluminium oxide | 1.79 |
| Cerium and yttrium earths | 2.86 |
| Phosphoric acid | 0.71 |
| Calcium oxide | 0.08 |
| Tantalum oxide | Present. |
| Total | 99.37 |

Florida also produces zircon, a typical sample analyzing as follows:

| | |
|---|---|
| Zirconium oxide | 62.16 |
| Titanium oxide | 2.13 |
| Silica | 30.02 |
| Ferric oxide | 0.60 |
| Aluminium oxide | 0.66 |
| Cerium and yttrium earths | 2.02 |
| Phosphoric acid | 0.82 |
| Calcium oxide | Undetermined. |
| Tantalum oxide | Undetermined. |
| Total | 98.41 |

If iron is present in the opacifying material in amounts greater than 0.75%, the enamel in which the opacifying agent is used is apt to be discolored. Under some circumstances not as yet fully explained, a higher percentage of iron may be present without apparent detrimental effect, but freedom from discoloration can only be assured, in my present opinion, by keeping the iron content below the limits designated. Preferably the amount of iron present should be less than 0.50%. Any process, therefore, intended for the production of an opacifying material from crude zircon, should be adapted not only to secure a proper chemical composition and to produce a suitable physical state of the constituents, but should also result in the removal of any excessive quantities of iron which may be present.

In accordance with my invention, the purification of the zircon is carried out as follows: The zircon is first separated from the associated minerals in any suitable way and is then wet-milled to a very high degree of fineness. I have obtained the best results by continuing the wet-milling for several days, at the end of which time the product will have completely lost its crystalline structure and become so fine as to be almost colloidal. It is this degree of fineness which is referred to as a "condition of extreme fineness" in the appended claims. The high degree of fineness produced in this operation seems to be in itself a factor of great importance in increasing the opacifying capabilities of the material, and it has the added advantage of rendering the iron present more amenable to processes intended for its removal.

The iron is suitably removed by heating the finely ground product with diluted sulfuric or hydrochloric acid, preferably under pressure. For example, the concentration of the acid used may be 50% of sulfuric acid or 50% of aqueous hydrochloric acid, the temperature of heating may be 200° C., and the time of heating about eight hours. A test of the treated material at any stage of the acid digestion will show whether or not the iron content has been brought within the desired limits and hence whether or not the treatment need be continued. The acid treatment may of course be modified according to the composition of the raw material in a manner which will be evident from the foregoing. The product obtained by the acid treatment is then thoroughly washed and dried.

At this stage the material is of a grayish-white appearance and highly voluminous, and may be used as an opacifier without further treatment. However, by strongly igniting the product, the opacifying qualities are remarkably enhanced, and in the preferred form of my invention a final ignition is therefore included. The ignition may be suitably carried out at 1000° C. and the time of heating may be, for example, two hours.

Of the three principal steps of the process as outlined above, the continued wet-milling seems to be indispensable if a high grade material is to be produced. The calcination has an extraordinary effect in improving the product, while the acid treatment should be resorted to in all cases where it is necessary or advisable to remove iron or like discoloring metal compounds.

The product of the treatment above described gives enamels of good white color and fair opacity, but having little lustre. Because of this deficiency it can be most advantageously used in conjunction with opacifiers which produce lustrous enamel and intense opacity, in particular tin oxide, although sodium metantimonate and other antimony compounds or substantially pure zirconium oxide, are almost as satisfactory. One or more of these opacifying agents may be used in conjunction with the treated zirconium silicate, the various proportions employed depending on circumstances. For the sake of illustration, I mention that I have obtained excellent results by using a mixture of 35% leukonin (sodium metantimonate) with 65% of zirconium silicate. Tin oxide or zirconium oxide may each be used with zirconium silicate in about equal proportions, but the proportions mentioned above may be varied within rather wide limits.

I have discovered that the deficient opacifying and gloss-giving qualities of pure zirconium silicate may be corrected to a very large extent by the presence of substances which normally occur with the zircon. Upon reference to the analyses above, it will be seen that zircon occurs associated with rare-earths and phosphates of the rare-earth metals, such as cerium, thorium and lanthanum, and that tantalum and titanium are very likely to be present. These materials in themselves possess a clouding value of high order and when used in conjunction with zirconium silicate, supply qualities which the silicate lacks, namely: lustre and opacifying quality.

It will be obvious that the mixture of zirconium silicate and the rare-earth and other compounds mentioned above, may be advantageously produced from the natural mineral simply by proceeding with the treatment of the same without preliminary separation of the associated minerals. These associated compounds may advantageously be present in the material treated in amounts varying from 1 to 10%, the upper limit being largely determined by the fact that the iron present occurs mostly in these associated minerals and if they are present in excessive amount the iron content tends to become so high that it cannot be readily brought within the necessary limits.

When the zircon is treated without the preliminary removal of the associated minerals, the steps of wet-milling, acid digestion and ignition are carried out exactly as when the zircon is preliminarily purified, with the exception that such preliminary purification tends to remove a portion of the iron, so that when it is practiced the acid digestion may be made less vigorous than when the associated minerals are not removed.

I claim:

1. Process of treating naturally occurring zirconium silicate to produce an enamel opacifier, which comprises wet-milling the material to a condition of extreme fineness, treating the milled material with an acid and then washing, drying, and strongly igniting the material.

2. Process of treating naturally occurring zirconium silicate to produce an enamel opacifier, which comprises separating the silicate from associated minerals which would impair the product, wet-milling the silicate to a condition of extreme fineness, treating the milled material with an acid, and then washing, drying and strongly igniting the material.

3. As an opacifying agent, a product such as may be obtained by wet-milling naturally occurring zirconium silicate to a condition of extreme fineness, treating the milled material with an acid and then washing, drying, and strongly igniting the material.

4. As an opacifying agent, a product such as may be obtained by separating naturally occurring zirconium silicate from associated minerals, wet-milling the zirconium silicate to a condition of extreme fineness, treating the milled material with an acid and then washing, drying, and strongly igniting the material.

5. An opacifying composition comprising the opacifying agent claimed in claim 4 and another opacifying agent.

6. An opacifying composition containing the opacifying agent claimed in claim 4 and another opacifying agent capable of giving an enamel of good lustre.

7. An opacifying composition comprising the opacifying agent claimed in claim 4 and tin oxide.

In testimony whereof, I affix my signature.

HUGH SPENCER COOPER.